United States Patent [19]
Jones et al.

[11] 3,792,681
[45] Feb. 19, 1974

[54] APPARATUS FOR INJECTION SPRAYING OF CONTAINERS

[75] Inventors: Walton B. Jones, Richboro; James N. Ademino, Ambler, both of Pa.; Neil D. Black, deceased, late of Philadelphia, Pa.; Ilene Black, administratrix, Melrose Park, Pa.

[73] Assignee: International Paper Company, New York, N.Y.

[22] Filed: Feb. 16, 1970

[21] Appl. No.: 11,733

[52] U.S. Cl. ............... 118/5, 118/2, 118/47, 118/62, 118/69, 118/319, 118/323, 118/317
[51] Int. Cl. ............... B05c 7/02, B05c 11/14
[58] Field of Search ... 118/317, 319, 62, 69, 5, 323, 118/302, 47, 2

[56] References Cited
UNITED STATES PATENTS

| | | | |
|---|---|---|---|
| 2,678,591 | 5/1954 | Fleming et al. | 118/69 X |
| 2,337,610 | 12/1943 | Kotcher | 118/69 X |
| 3,220,381 | 11/1965 | Alholm | 118/318 |
| 2,381,360 | 8/1945 | Monroe | 118/69 X |
| 3,556,049 | 1/1971 | Hedden et al. | 118/317 X |
| 752,768 | 2/1904 | Goodwin | 118/5 |
| 2,512,651 | 6/1950 | Jacobs | 118/317 X |
| 3,044,894 | 7/1962 | Makowski et al. | 118/317 X |

*Primary Examiner*—John P. McIntosh
*Attorney, Agent, or Firm*—Charles B. Smith; Ronald F. Ball

[57] ABSTRACT

Apparatus for injection spraying of the inner surface of a container comprising a container loading arm for orienting containers in an upright position on the apparatus and a slide guide having its input end in the vicinity of the container loading arm. The slide guide guides the upright container through the apparatus. An injection spray gun is mounted along the slide guide on a piston. A cooling fountain is situated under the slide guide between the input of the slide guide and the injection spray gun. The carton is moved, by means of air nozzles, along the slide guide and over the cooling fountain in order to pre-cool the bottom of the container prior to spraying. The piston is activated by means of a cammed timer switch and by the proper positioning of the container. The gun descends into the container to spray the bottom surface of the container and the lower portions of the vertical sides of the container with a sealing material. After the gun has sprayed the bottom surface of the container, it is withdrawn from the container and a pusher rod contacts the container and pushes the container through a heater station where the sealing material is heated and blended to form a uniform bottom seal. After heating the sealing material within a container, the carton is pushed off of the injection spray apparatus by the pusher rod.

6 Claims, 18 Drawing Figures

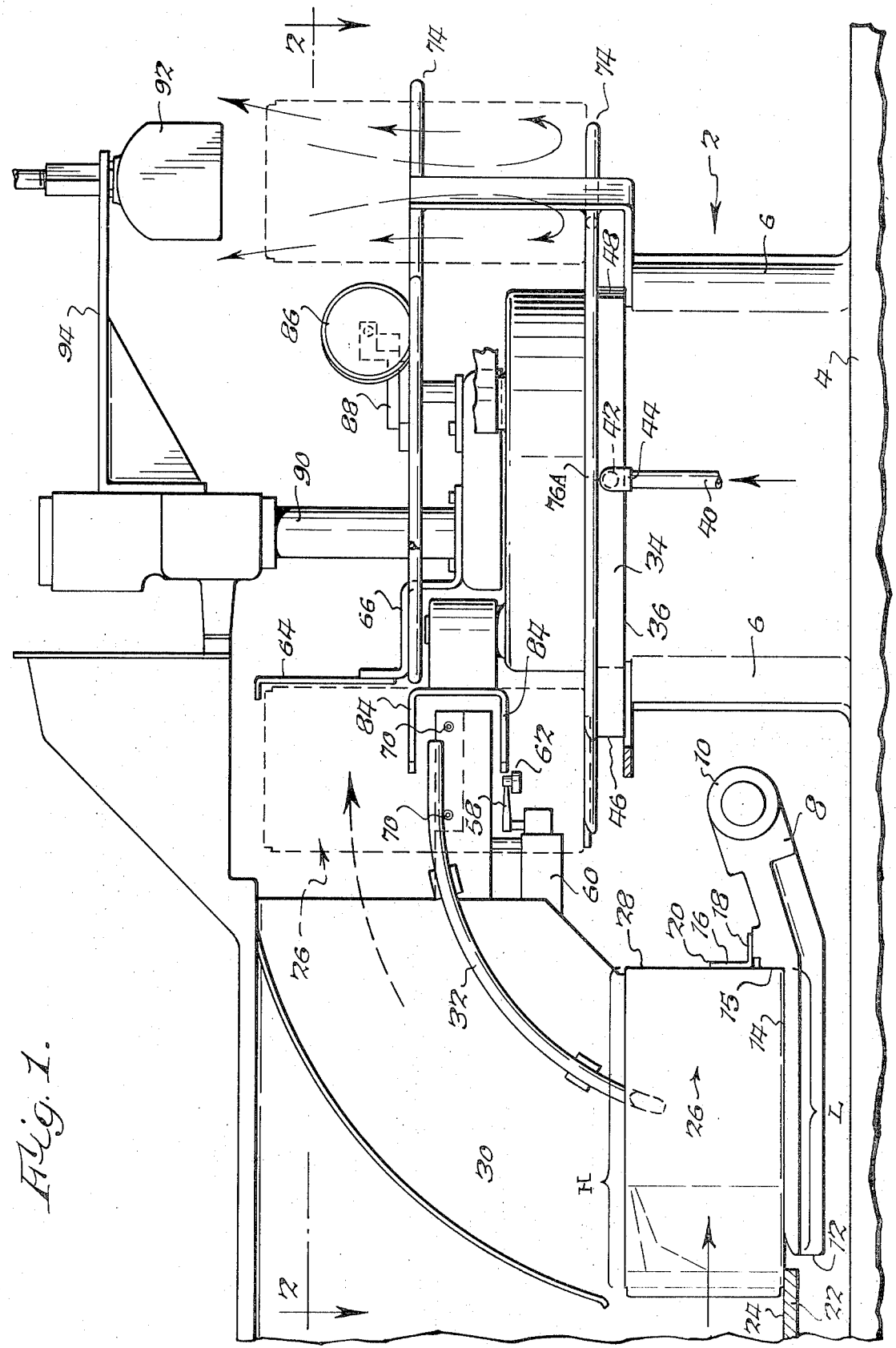

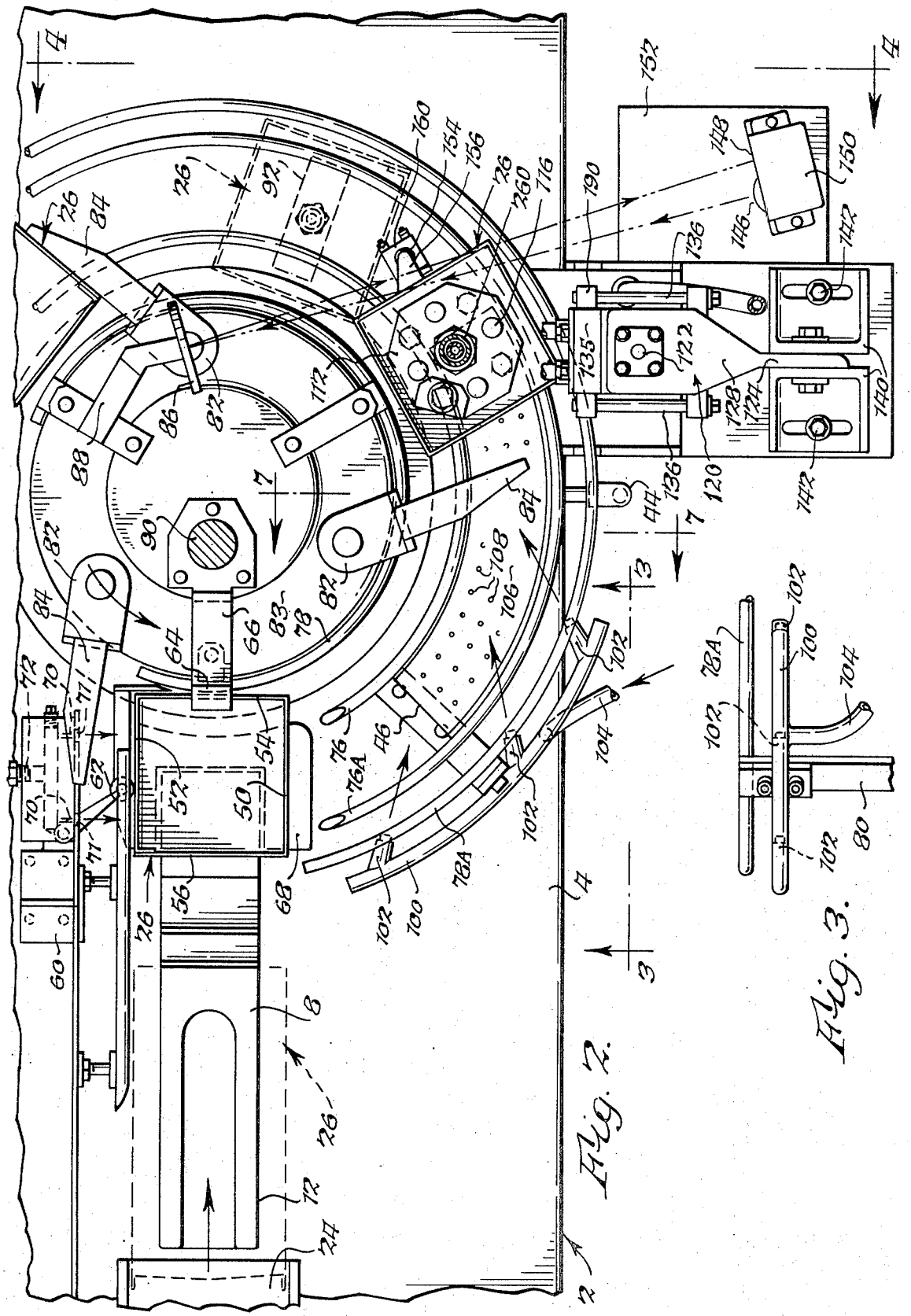

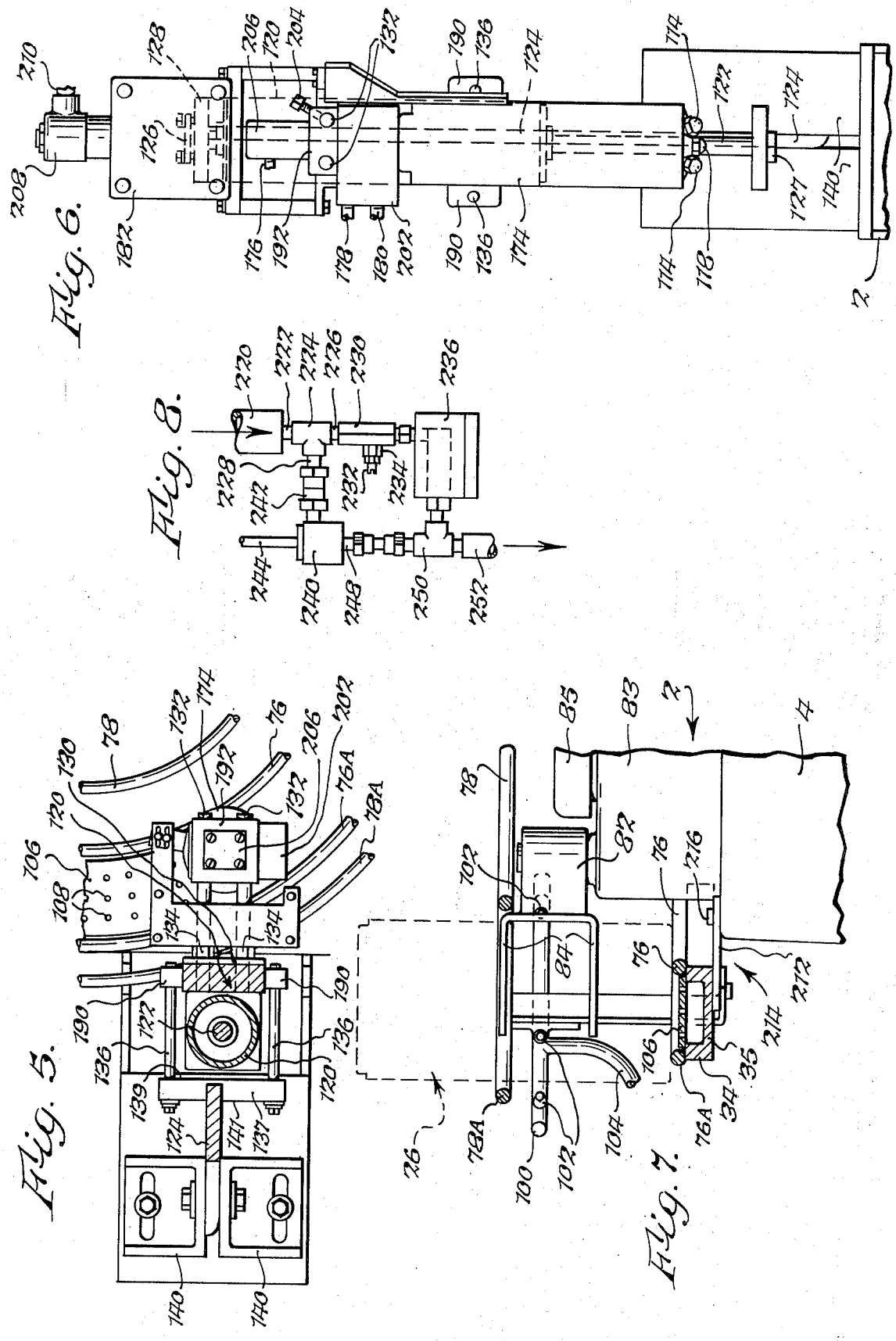

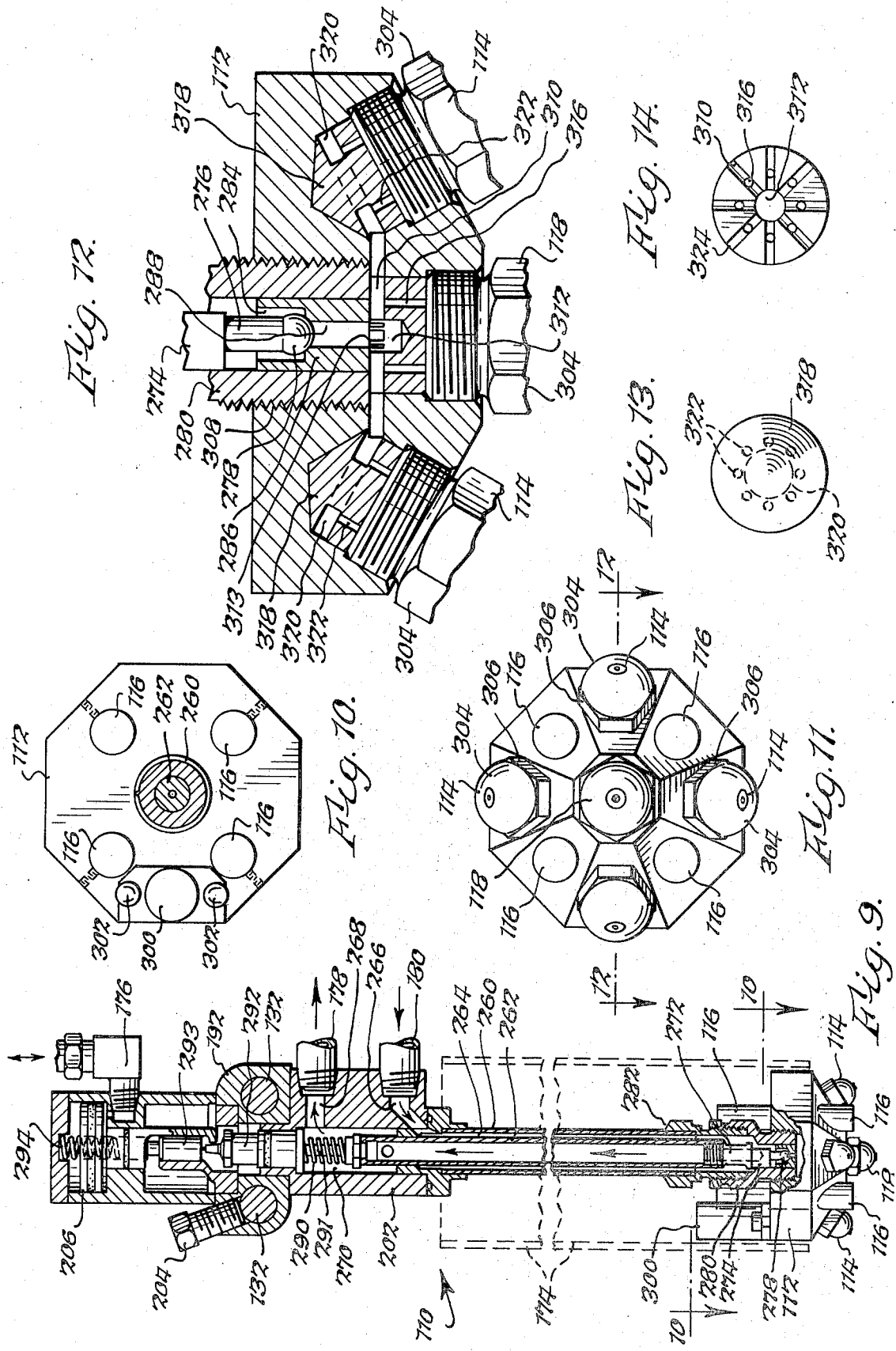

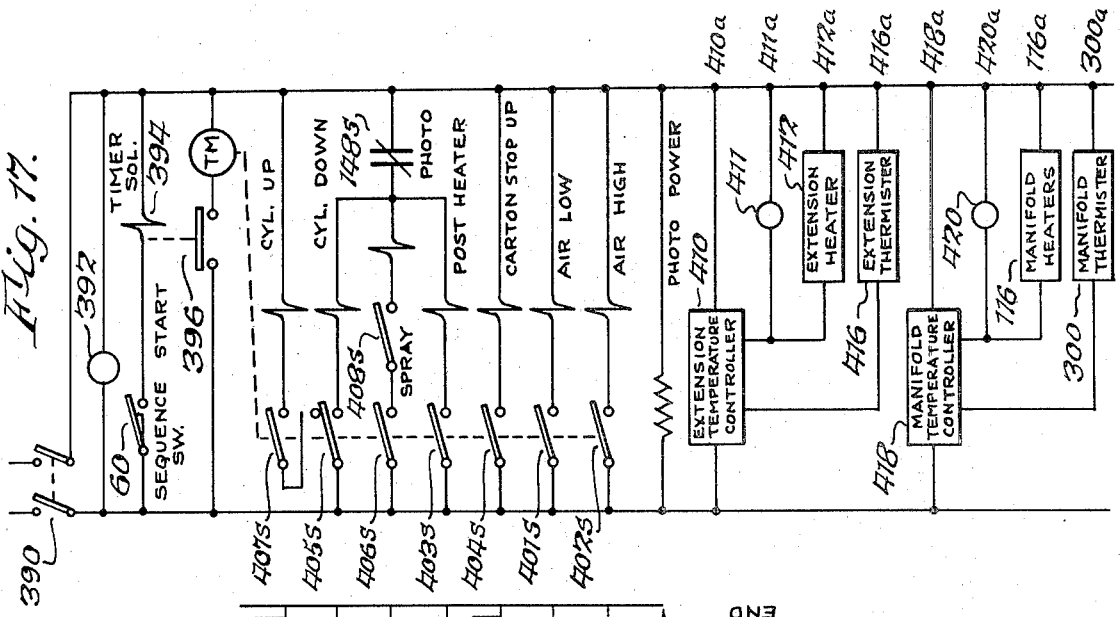
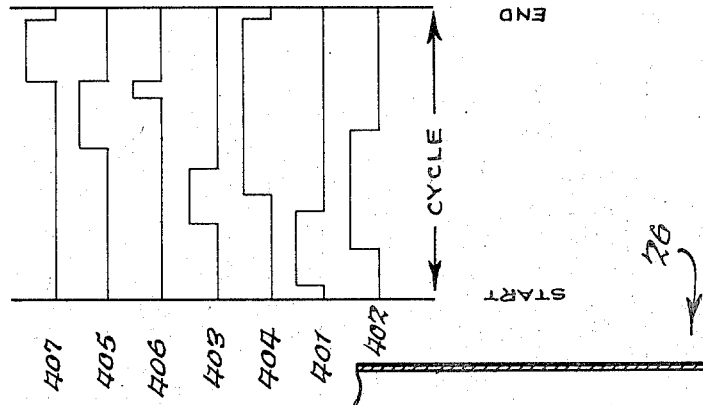
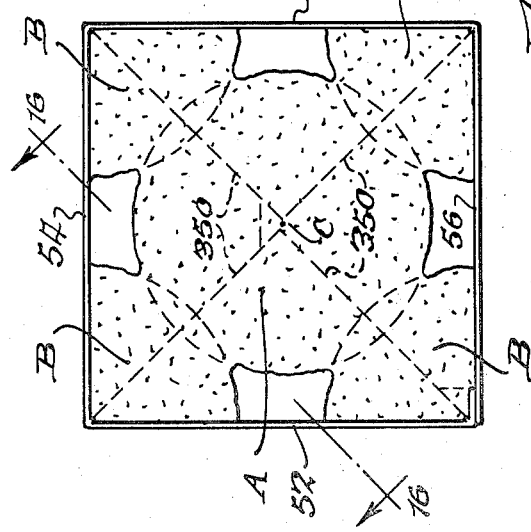
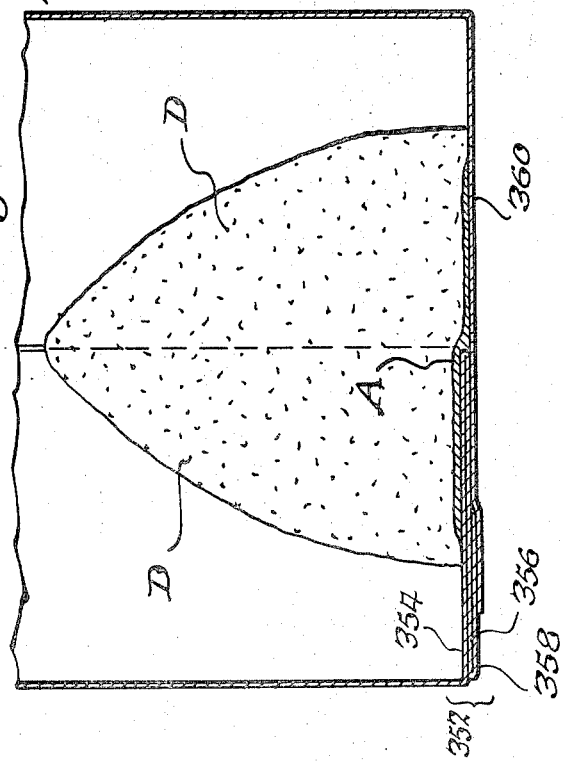

APPARATUS FOR INJECTION SPRAYING OF CONTAINERS

BACKGROUND OF THE INVENTION

A great number of liquids are being presently transported in paperboard or fiber containers rather than in glass containers or metal containers. Glass containers have the disadvantage of being fragile and require adequate spacing between the containers to prevent contact and possible breakage. Glass has the notable advantage of being impervious to the chemical action of most liquids.

Metal containers, on the other hand, do not pose the same breakage problem as do glass containers; however, metal containers are undesirable for the transportation of certain liquids because the liquids may react with the metal thereby imparting undesirable flavors to the liquids. Paperboard containers, on the other hand, are not as fragile as glass containers and generally, when properly coated, do not react with the liquids which are transported in them.

In the manufacture of paperboard containers, a sheet of paperboard is coated with a plastic or wax resin to render it impervious to the action of the liquid to be transported in the container. The paperboard blank is then appropriately folded to form the container structure. However, in folding a coated blank, the coating material along the edges at which the folding occurs is generally weakened. At those points where the material has been folded more than once, for example, at one of the bottom corners of the paperboard container, there is a tendency for the coating material to split and become disassociated from the paperboard of the carton.

An objectionable effect is that the liquid may be absorbed by the exposed paperboard. As a result of the capillary action within the paperboard, the moisture will tend to travel from the point of entry into the paperboard thereby loosening the coating material and exposing more paperboard. This can result in a leak which will cause a loss in the liquid to be transported and may cause injury to adjacent paperboard cartons.

BRIEF SUMMARY OF THE INVENTION

It is desirable to recoat the lower portion of a partially assembled but unfilled carton prior to its being filled with the liquid to be transported. The recoating apparatus should be capable of spraying a protective hot melt into the bottom of the container without necessitating stopping the filling machine in order to adequately coat the bottom of the container. An injection spray apparatus having a cluster of nozzles is disposed intermediate the container manufacturing apparatus and the container filling apparatus.

A loading guide assembly places the containers having a formed bottom onto a slide guide so that the formed bottom of the container rests on the slide guide. A cooling fountain is disposed along a portion of the length of the slide guide. The fluid in the cooling fountain is in close juxtaposition to the lower surface of the bottom of the container, thereby cooling the bottom of the container. Air jets start the container into motion along the slide guide so that it will arrive at the injection spray gun a predetermined amount of time before a pusher assembly meets the trailing vertical surface of the container to further advance the container. As the container is advanced towards the injection spraying position, the container triggers a photoelectric cell, which in conjunction with the cammed timer assembly, activates an injection spray apparatus and causes it to descend a predetermined distance.

An injection spray gun is affixed to the injection spray apparatus and is situated over the open mouth of the container. Lowering the injection spray apparatus results in the insertion of the injection spraying gun into the container.

The injection spray gun is designed so as to direct a spray of sealing material into the corners and the center of the bottom of the container. Upon completion of the spraying, the injection spray gun is removed as a result of the injection spray apparatus moving upwardly in response to a programmed cammed timing assembly. As the gun is removed, the pusher rod contacts the rearmost surface of the container and advances the container through the next position where a heater flames into the container to melt the sealing material and cause the material to flow thereby fusing loose sealing material into the congealed layers. After heating, the carton is removed to a filling station.

BRIEF DESCRIPTION OF THE DRAWINGS

FIG. 1 is a vertical side elevation of one embodiment of the apparatus having certain parts broken away;

FIG. 2 is a horizontal sectional plan showing the entrance and exit paths of the apparatus;

FIG. 3 is a fragmentary section along line 3—3 of FIG. 2 showing a high pressure jet and associated piping for use with the apparatus;

FIG. 5 is a horizontal section taken along line 5—5 of FIG. 4 showing the guide slide and injection spray assembly;

FIG. 6 is a front elevation of the injection spray assembly taken along line 6—6 of FIG. 4;

FIG. 7 is a vertical section along line 7—7 of FIG. 2 showing the cooling fountain, and slide guide of the apparatus;

FIG. 8 is a frontal view of the tubing supplying gas to a heater assembly;

FIG. 9 is a vertical section taken through the injection spray gun;

FIG. 10 is a horizontal section along line 10—10 of FIG. 9 showing the configuration of the injection spray head;

FIG. 11 is a bottom view of the injection spray head;

FIG. 12 is an enlarged cross-section taken along line 12—12 of FIG. 11 showing the injection spray head of the injection spray gun;

FIG. 13 is a cross-sectional view of a peripheral spray nozzle insert;

FIG. 14 is a plan view of a center spray nozzle insert;

FIG. 15 is a plan view looking into a sprayed carton;

FIG. 16 is an oblique sectional view taken along line 16—16 of FIG. 15 looking into one corner of the sprayed carton;

FIG. 17 is a simplified circuit diagram of the electrical system which causes the machine to operate in a timed sequence; and FIG. 18 is a cam schedule of the sequential timer used in the electrical circuit diagram of FIG. 17.

DETAILED DESCRIPTION OF ONE EMBODIMENT OF THE INVENTION

Figure 4:
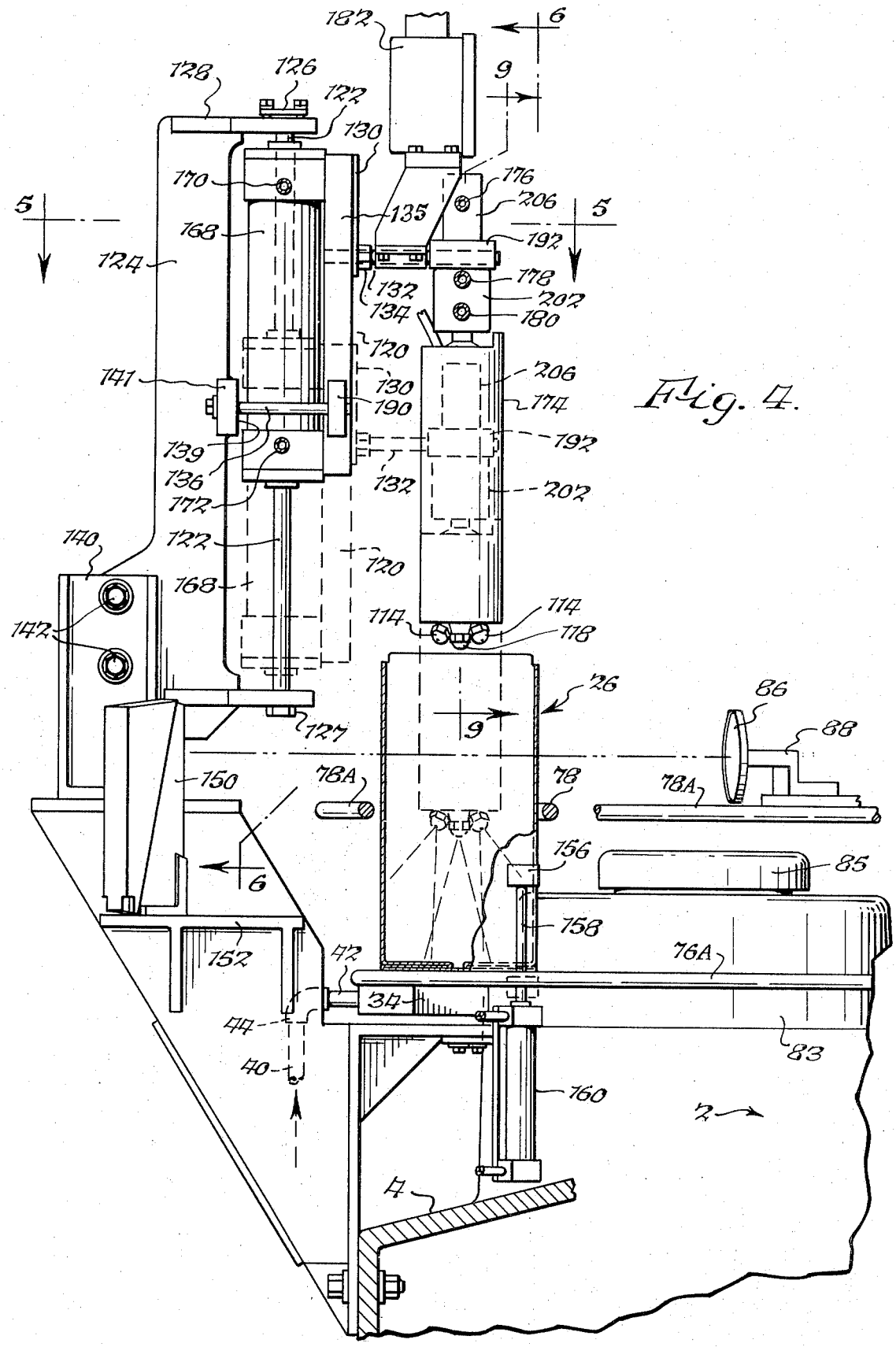
FIG. 4 is a vertical section taken along line 4—4 of FIG. 2 of the injection spray assembly.

Referring now to FIG. 1, there is shown a frame 2 comprising a base 4 and a plurality of vertical support members 6 rigidly affixed to the base 4. The vertical support members 6 are parallel to one another and perpendicular to the base 4. A loading arm 8 is pivotally affixed at one of its two ends 10 to frame 2. The loading arm 8 has a receiving end 12 opposed to the pivotally mounted end 10. A positioning groove 14 is situated on the upper surface of the loading arm 8. The positioning groove 14 has a length "L" which is less than the height "H" of the container which is being loaded. The positioning groove 14 starts at the receiving end 12 of the loading arm 8. An L-shaped container stop 16 is rigidly affixed to end 15 of the positioning groove 14 opposite receiving end 12 such that a first leg 18 of the L-shaped container stop 16 is substantially parallel to the plane of the positioning groove 14 while the second leg 20 of the L-shaped container stop 16 is substantially perpendicular to the first leg 18 and simultaneously perpendicular to the plane of the positioning groove 14.

A conveyor generally labeled 22 having a conveying surface 24 delivers the bottom-formed containers to the loading arm 8. The conveying surface 24 is substantially coplanar with positioning groove 14 to allow a container 26 to slide easily onto the positioning groove 14.

The container 26 may be of any suitable type, e.g., a container of the type shown and described in U.S. Pat. No. 3,365,111, issued Jan. 23, 1968.

The height "H" of the container 26 is along and adjacent to the positioning groove 14 and the bottom 28 of container 26 is parallel and adjacent to the second leg 20 of L-shaped container stop 16. Vertical guide wall 30 is rigidly affixed to frame 2. An arcuate runner 32 is rigidly affixed to vertical guide wall 30 such that the arc of the arcuate runner 32 follows the arcuate path described by the pivotal motion of pivotally mounted loading arm 8. A cooling fountain 34, which is more fully described hereinbelow, is rigidly affixed to vertical support members 6 such that the floor 36 of the cooling fountain 34 is substantially parallel to base 4 and the vertical walls 38 of the cooling fountain 34 are perpendicular to base 4 and parallel to vertical support member 6.

A tube 40 is affixed to spigot 42 by means of hose coupling 44. The tube 40 carries cooling liquid to the cooling fountain 34. In the preferred embodiment of the instant invention the cooling fountain 34 describes an arc subtending on angle of approximately 80° to 90° and has a receiving end 46 and discharging end 48. The cooling fountain is positioned so that the receiving end 46 is approximately 45 degrees downstream of the entry position of the container 26 and the discharging end 48 is approximately under an injection spray gun 110.

The container 26 has four vertical surfaces: a leading surface 50, a trailing surface 52, an inner surface 54, and an outer surface 56. An arm 58 having a first and a second opposed ends is rigidly mounted at its first end on a rod 59. The rod 59 is pivotally mounted on a sequence starter switch 60. As the container 26 is placed on the transfer platform 68, a push rod base 82 having a set of push rod arms 84 pivots the arm 58 about the rod 59 and activates the sequence start switch 60. A roller bearing 62 is rotatably mounted on the second end of the arm 58 to allow the pusher body 82 to pass after having activated the sequence start switch 60. A vertical container stop 64 is rigidly affixed to a bracket 66 which is, in turn, rigidly affixed to the frame 2. A horizontal transfer plateform 68 is rigidly affixed to the frame 2 and provides a support for the bottom 28 of the container 26. A number of air jets 70 are connected to a low pressure air source (not shown) by means of a tube 72. The air jets 70 are capable of emitting a stream of air perpendicular to the trailing surface 52.

a slide guide 74 is rigidly affixed to the cooling fountain 34. The slide guide 74 describes a substantially annular travel path. The slide guide 74 has two lower slide guide members 76, 76A and two upper slide guide members 78, 78A. The innermost lower slide guide member 76 has a radius of curvature substantially similar to the inner radius of curvature of the cooling fountain 34, and the outermost lower slide guide member 76A has a radius of curvature substantially similar to the outer radius of curvature of the cooling fountain 34. The innermost upper slide guide member 78 has a radius of curvature smaller than the radius of curvature of the innermost lower slide guide member 76, while the outermost upper slide guide member 78A has a radius of curvature greater than the radius of curvature of the outermost lower slide guide member 76. The upper slide guide members 78, 78A are displaced horizontally from one another by a distance approximately equal to the width of the container at its widest point. The outermost lower slide guide member 76A is maintained a fixed distance from the outermost upper slide guide member 78A by means of an "L" bracket 80. One leg of the "L" bracket 80 is affixed to one of the vertical support members 6 and the other leg of the "L" bracket 80 is affixed rigidly to the outermost lower slide guide member 76A and outermost upper slide guide member 78A.

The push rod base 82 is mounted rigidly on rotating plate 83. The rotating plate 83 is substantially co-axial with the center of the frame 2 and imparts circumferential motion to push rod base 82, thereby forcing push rod base 82 to travel around the central longitudinal axis of frame 2. The push rod U-arms 84 are rigidly affixed to the push rod base 82 and extend outwardly and horizontally from the push rod base 82 into the travel path provided by the slide guide 74.

A mirror 86 is rigidly mounted on the frame 2 approximately 250 degrees counterclockwise from the transfer platform 68 by means of a mounting bracket 88. A central vertical support post 90 is affixed rigidly to frame 2. A heater 92 is affixed rigidly to the vertical support ports 90 by means of a horizontal "L" bracket 94.

Referring now to FIG. 2, there is shown a horizontal sectional view taken along line 2—2 of FIG. 1 in which the container 26 is positioned on the transfer platform 68 by means of the loading arm 8. The arm 58 is pivotally mounted on the sequential starter switch 60 and is pivoted by contact with the pusher body 82 and the pusher arms 84. Each of the jets 70 has an aperture 71 situated in a plane perpendicular to the trailing surface 52 of the container 26 to emit low pressure air streams which strike the trailing surface 52 of the container 26 in an approximately normal orientation to the trailing surface 52. Concurrently, the pusher body 82 and the push rod U-arms 84 are in counterclockwise motion about the central longitudinal axis of the frame 2. The rotating plate 83 rotates in a counterclockwise direction. The pusher body 82 and the push rod U-arms 84 are behind the container 26 as it is placed onto the transfer platform 68.

Tubing 100 having a radius of curvature greater than the radius of curvature of the outermost upper slide guide members 78, 78A and in a plane substantially parallel to the plane formed by the uppermost slide guide members 78, 78A is rigidly affixed to the bracket 80 approximately one-half of the distance between the bottom of the carton 26 and the top of the carton. The tube 100 is a substantially hollow tubular member capable of carrying high pressure air and having a plurality of nozzles 102 capable of emitting a stream of air having a force component in the direction of motion of the container 26 and approximately tangential to the circle defined by the innermost lower slide guide member 76. A hose 104 is affixed to the tubing 100 and serves as a conduit for high pressure air from an air source (not shown) to the tubing 100.

As can be more fully seen in FIG. 2, the cooling fountain 34 subtends an angle of approximately 80° to 90° and has a receiving end 46 situated at approximately 45°, in a counterclockwise direction, from the center of the transfer platform 68. The cooling fountain 34 has an uppermost surface 106 having a plurality of apertures 108 distributed in a series of concentric circles, each circle subtending an angle of approximately 80° to 90°, and coaxial with the central longitudinal axis of the apparatus.

An injector spray gun 110 is located along the slide guide 74 in the vicinity of the discharge end 48 of the cooling fountain 34. The injector spray gun 110 has an injector spray head 112 having a plurality of spray nozzles 114 distributed uniformly around the periphery of the injector spray head 112. In FIG. 2, the spray head 112 has a substantially octagonal peripheral configuration. A set of peripheral spray nozzles 114 are situated within spray head 112 in close juxtaposition to every other face of the injector spray head 112 so as to form a square. Four heaters 116 are situated around the periphery of the injector spray head 112. Each heater 116 is intermediate two of the spray nozzles 114 and approximately equidistant from both of the spray nozzles 114. The heaters 116 form a square such that one heater 116 is at each vertex of the square. A central vertical spray nozzle 118 is situated in the center of the injector spray head 112. The central axis of the central spray nozzle 118 is substantially coaxial with the longitudinal axis of the injector spray head 112.

Injector spray gun mounting assembly, generally labeled 120, is mounted slidably on a vertical post 122. The vertical post 122 has an upper end 123 and a lower end 125. The upper end 123 of the vertical post 122 is affixed rigidly to a horizontal support bracket 128 by means of retaining collar 126. The lower end 125 of piston rod 122 is rigidly affixed to horizontal support bracket 127 by means of a retaining collar 127. The upper horizontal support bracket 128 and the lower horizontal support bracket 129 are affixed rigidly to a vertical support member 124. The vertical support member 124 is affixed rigidly to frame 2 by means of U-clamps 140. The U-clamps 140 are affixed rigidly to frame 2 by adjustable nuts 142. The injector spray gun mounting assembly 120 has a frontal surface 130 which faces the carton 26 and is substantially parallel to the vertical sides of the carton 26.

A number of horizontal support rods 132 extend from the frontal surface 130 of the injector spray gun mounting assembly 120. The horizontal support rods 132 extend in the direction of the container 26. The horizontal support rods 132 are affixed rigidly to the frontal face 130 by retaining collars 134. The horizontal support rods 132 serve as a means for supporting the injection spray gun 110 and impart complementary motion to the injector spray gun 110 upon movement of the injector spray gun mounting assembly 120 in a vertical direction along the vertical post 122. A first frontal retaining pad 135 is disposed intermediate frontal plate 130 and the injector spray gun mounting assembly 120. The first frontal retainer pad 135 has a horizontal dimension which is greater than the horizontal dimension of the injector spray gun mounting assembly 120. The first frontal retainer pad 135 has a set of threaded holes traversing the thickness of the first frontal retainer pad 135 and situated in close proximity to each vertical edge of the first frontal retainer pad 135.

A mounting bracket 137 is affixed rigidly to the vertical support member 124. The mounting bracket 137 has a width which is substantially equal to the width of a second frontal retainer pad 190 and furthermore has holes along its vertical edges traversing the thickness of the mounting bracket 137 and situated such that each one of the holes is substantially coaxial with one of the holes in the second frontal retainer pad 190. A retainer rod 136 is threaded into each hole in the frontal retainer pad 190 and is passed through the corresponding hole in the mounting bracket 137, thereby substantially encircling the injector spray gun mounting assembly 120. Because the second retainer pad 190 is in close juxtaposition to the injector spray gun mounting assembly 120, it prevents the injector spray gun from rotating about its central longitudinal axis, which is substantially coaxial with the central longitudinal axis of the vertical post 122.

A light source 146 and a photo-responsive cell 148 are housed within enclosure 150. The enclosure 150 is affixed rigidly to support platform 152 so that the light source 146 is in optical alignment with the mirror 86. The light reflected by the mirror 86 from the light source 146 is reflected to the photo-responsive cell 148. The light source 146 is situated outside of the outermost lower slide guide members 76A, while the mirror 86 is situated inside of the circle formed by the innermost lower slide guide member 76. Therefore the mirror 86 is situated so that the light emitted by light source 146 must traverse the travel path of carton 26 before being reflected back to the photoelectric cell 148. A carton stop 154 is situated intermediate the two lower slide guide members 76. The stop 154 has an arm 156 which is affixed rigidly to vertical stop piston 158. Vertical stop piston 158 extends into a vertical stop cylinder 160 and is slidably mounted in the vertical direction within the stop cylinder 160. The timer sequence of the timer motor causes the vertical stop piston 158 to be raised and lowered within the vertical stop cylinder 160.

Referring now to FIG. 3, there is shown a fragmentary section along line 3—3 of FIG. 2 in which the outermost upper slide guide member 78A and the high pressure jets and piping for advancing the container are detailed. Vertical bracket 80 is rigidly affixed to frame 2. The outermost upper slide guide member 78A has a radius of curvature greater than the radius of curvature of either of the lower slide guide members 76, 76A. The outermost upper slide guide member 78A is affixed rigidly to the inner surface of the vertical bracket 80 so that the outermost upper slide guide member 78A is in close proximity to carton 26. A high pressure air tube 100 having a radius of curvature greater than that of the outermost upper slide guide member 78A is affixed to the outer surface of the vertical support bracket 80 at a point below the point at which the outermost upper slide guide member 78A is affixed to the vertical support bracket 80. A number of high-pressure air nozzles 102 are situated along the inner periphery of the high-pressure air tube 100. The high-pressure stream of air emitted from each of the high-pressure nozzles 102 is directed inwardly, and is substantially parallel to the plane of the high-pressure air tube 100. Tubing 104 supplies air to the high-pressure tubing 100, from a source of high pressure air (not shown).

Referring now to FIG. 4 there is shown a vertical section of the injector spray gun mounting assembly and the injector spray gun in which the solid lines indicate the rest position of the injector spray gun mounting assembly and the injector spray gun and the phantom lines represent the operational position of the injector spray gun mounting assembly and the injector spray gun. The injector spray gun mounting assembly 120 is slidably mounted on the vertical post 122 by means of a mounting cylinder 168. The mounting cylinder 168 has an upper nozzle 170 and a lower nozzle 172 which lead into the mounting cylinder 168 and provide an air passage into the mounting cylinder 168. Air under pressure can be supplied to the upper nozzle 170 or to the lower nozzle 172 in order to increase the pressure in either the upper or lower portions of the mounting cylinder 168 and thereby move the mounting cylinder 168 downwardly or upwardly respectively along vertical post 122. A nozzle 176 is affixed to an upper air housing 206 of the injector spray gun 110 as will be hereinbelow discussed. Sealing material nozzles 178 and 180 are affixed to a sealing material housing 202 of the injector spray gun 110 as will be discussed in the detail drawings. A housing 182 is affixed rigidly by means of brackets 184 to the horizontal support rods 132. As can be seen in FIG. 4, the horizontal support rods 132 traverse frontal surface 130 of the injector spray gun mounting assembly 120 and provide a horizontal support for both the housing 182, which houses the electrical connections for the apparatus and the injector spray gun 110.

The stop arm 156 is rigidly affixed to the stop piston 158 at the upper end of the stop piston 158. The stop piston 158 extends into the stop cylinder 160, which is affixed rigidly to the frame 2. The cylinder 160 is vertically mounted so that the piston 158 rises and descends into the cylinder 160. The stop arm 156 on the stop piston 158 descends below the level of the lower slide guide members 76, 76A.

Referring now to FIG. 5 there is shown a horizontal section of the injector spray gun 110 and the injector spray gun mounting assembly 120. The mounting plate 137 has an inner vertical surface 139 and an outer vertical surface 141 and is affixed rigidly to the vertical support member 124. The inner vertical surface 139 and the outer vertical surface 141 are substantially transverse to the horizontal axis of the vertical support member 124. A set of clamping rods 136 are mounted on the mounting plate 137. They are situated perpendicular to the inner vertical surface 139 and the outer vertical surface 141 of the mounting plate 137. The clamping rods 136 extend through the second retaining pad 190 at the lateral extremities of the retaining pad 190. The second retaining pad 190 is substantially parallel to the mounting plate 137. The second retaining pad 190 is in close juxtaposition to the mounting cylinder 168 so that the clamping rods 136, the mounting pad 137, and the second retaining pad 190 form an enclosure with mounting cylinder 168 substantially in the center of the enclosure.

The horizontal support rods 132 extend from the frontal surface of the injector spray gun mounting assembly 120. The horizontal support rods 132 are substantially parallel to one another and coplanar and the plane defined by the two support rods 132 is substantially horizontal. The bracket 184 is affixed to both of the horizontal support rods 132 and it lies in the plane formed by the two horizontal support rods 132. A clamp 192 is rigidly affixed to injector spray gun 110 at a point intermediate the air nozzzle 176 and the sealing material nozzle 178. The clamp 192 is substantially coaxial with the longitudinal axis of the injection spray gun 110. The horizontal support rods 132 are affixed rigidly to the clamp 192 and are substantially transverse to the surface of the injector spray gun mounting assembly 120.

Referring now to FIG. 6 there is shown a front elevation of the injector spray gun mounting assembly 120 and the injector spray gun 110 in which the piston rod 122 is rigidly affixed at its upper end to the horizontal platform 128 and at its lower end to the horizontal platform 129. The mounting cylinder 168 is substantially coaxial with the vertical post 122 and is capable of slidable motion on the vertical post 122. The sealing material housing 202 of the injector spray gun 110 is situated at the upper extremity of injector spray gun housing 174. The clamp 192 is situated parallel to and above the material spray housing 202. The horizontal support rods 132 pass through the clamp 192 and are parallel to the plane of the clamp 192. A set screw 204 is mounted in the clamp 192. The head of the set screw 204 extends outwardly from the clamp 192 and the setting end of the set screw 204 is in contact with one of the horizontal support rods 132 to secure the clamp 192 onto one of the horizontal support rods 132. The air housing 206 is situated above the clamp 192, and the air nozzle 176 extends into the air housing 206. An electrical solenoid valve 208 is mounted on housing 182 and controls the flow of air to air nozzzle 176.

Referring now to FIG. 7 there is shown a vertical section showing the various components of the spraying station with a carton 26 illustrated in phantom lines. The push body 82 is rigidly affixed to the rotating plate 83. The rotating plate 83 is rotatably affixed to the frame 2 so that the center of the rotating plate 83 remains stationary while a point on the edge of the rotating plate 83 describes a circular path. A center mount 85 is affixed rigidly to frame 2 and is substantially coaxial with the rotating plate 83. The center mount 85 provides a mounting member for the vertical support member 90 which is rigidly affixed to the center mount 85.

The arms 84 of the push rod assembly are affixed rigidly to the push body 82, and they form a substantially U-shaped member having two legs which are parallel to one another and horizontally oriented.

The cooling fountain 34 is affixed rigidly to a mounting bracket 212 by means of a screw 214. The mounting bracket 212 is horizontally situated and is rigidly affixed to the frame 2 by means of a mounting screw 216. The cooling fountain 34 comprises a trough shaped member 35. The trough shaped member 35 subtends an arc of approximately 80° to 90° and has an open upper surface. The top 106 having a pair of plane parallel faces is disposed over substantially the entire upper surface of the cooling fountain 34. The apertures 108 which extend between the plane parallel faces of the top 106 are disposed in a series of substantially concentric circles with respect to the center of the circle subtended by the cooling fountain 34. The lower slide guide members 76, 76A are disposed along either arcuate edge of the top 106. The lower slide guide members 76, 76A have an upper edge which is above the upper surface of the top 106. This permits the carton to slide along slide guide members 76 without blocking any of the apertures 108 in the top 106.

Referring now to FIG. 8 there is shown a view of the tubing employed to supply gas to the heating post 92. Input tubing 220 is affixed at one of its ends to a supply of gas (not shown) and at its other end to rigid tubing 222. The rigid tubing 222 is inserted into one end of the cross-piece of a T-junction tube 224. Tubing 226 is inserted into the other end of the cross-piece of the T-junction tube 224, while tubing 228 is inserted into the foot of the T-section tube 224. A needle valve assembly 230 is affixed to the unattached end of the tubing 226. The needle valve 230 comprises a needle 232 which is situated within needle housing 234 and extends into the body of the needle valve 230 to regulate the flow of gas through the needle valve 230. The needle 232 is adjusted so as to allow sufficient gas to pass through the needle valve to maintain the operation of a pilot light. An "L" tube 236 is affixed to the end of the needle valve 230 opposite tubing 226. Tubing 228 is affixed to an electrical solenoid valve 240 by means of a tube coupling 242. The electrical solenoid valve 240 is operated by an electrical connection 244 to regulate the flow of gas past the electrical solenoid valve 240. The electrical solenoid valve 240 has an input end 246 and an output end 248. The output end 248 of the solenoid valve 240 is connected to one end of a T-junction tube 250. The foot of the T-junction tube 250 is connected to the open end of the L-tube 236. The other end of the T-tube 250 is affixed to outflow tubing 252.

When gas is fed into the tubing 220, it flows down past the needle valve 230 which regulates the amount of gas required for pilot operation. The electrical solenoid valve 240 is normally closed, thereby preventing the flow of gas through the foot of the T-tube 224. The gas passing through the needle valve goes through the L-tube 236, then into T-junction tube 250, down tubing 252 and into the burner. When full gas flow is desired, the electric solenoid valve 240 is activated by means of the electrical connection 242 to allow a full volume path to be established between the foot of the T-junction tube 224 and the burner (not shown).

Referring now to FIG. 9, there is shown a vertical section through the injector spray gun 110. The spray gun 110 described is an automatic extension gun designed for use with an airless spray, such as that manufactured by the Nordson Corporation under the name Versa-Automatic Gun. However, other types of injector spray guns are within the knowledge of those skilled in the art and the use of an airless spray gun is not meant to exclude the use of equivalent injector spray guns. Injector spray gun 110 comprises an outer tubular shell 260 and an inner tubular shell 262. The inner tubular shell 262 has an outer peripheral contour similar to, but smaller than the inner peripheral contour of the outer tubular shell 260. The outer tubular shell 260 and the inner tubular shell 262 are substantially coaxial with one another and the tubular shell 262 is within the tubular shell 260, so that an annular passage 264 is provided along substantially the entire juxtaposed lengths of the tubular shells.

The sealing material nozzle 180 is inserted into a first aperture 266 within the sealing material housing 202. The first aperture 266 communicates between the sealing material nozzle 180 and the annular passage 264 at the uppermost edge of the outer tubular member 260. The nozzle 178 is inserted into an aperture 268 within the sealing material housing 202 such that the aperture 268 is above the aperture 266. The sealing material housing 202 has a central vertical tunnel 270 running the entire vertical length of the housing 202. The aperture 268 communicates with the inner surface of the tubular member 262 by means of the central vertical tunnel 270. A tubular section 272 having a threaded upper portion is threaded onto the lower end of the inner tubular shell 262 so that the tubular section 272 is substantially coaxial with the inner tubular shell 262. A hemicylindrical shield member 274 having a diameter substantially similar to that of the tubular section 272 is affixed to the lower end of the tubular section 272. A rod 276, having a diameter less than that of the hemicylindrical shield member 274, is affixed rigidly to the lower end of the hemicylindrical shield member 274 coaxial with the inner tubular shell 262. A ball 278 is affixed to the lower end of rod 276. The lower ends of the outer tubular shell 260 and the inner tubular shell 262, along with the tubular section 272, the hemicylindrical shield 274 and the rod 276 are inserted within a housing 280. The housing 280 has a cylindrical passage running the entire vertical length of the housing 280. Open end 282 of the passage in the housing 280 has a configuration substantially similar to the outer configuration of the outer tubular shell 260. The outer tubular shell 260 and the associated tube assembly is inserted within the housing 280. The cylindrical passage narrows to an aperture 284 at its lower end. A plug 286 is inserted within the aperture 284. The plug 286 has an aperture 288, the aperture 288 having a diameter which is substantially smaller than the diameter of the ball 278. The aperture 288 is substantially coaxial with the entire tube assembly so that the ball 278 rests on and seals the aperture 288. The ball 278 is held against the upper edge of the aperture 288 by means of a biasing assembly comprising a rod 291, which is coaxial with the inner tubular shell 262, and is affixed to the upper end of the inner tubular shell 262. The rod 291 passes through the sealing material housing 202 and into the air housing 206. A piston 293 is situated above post 292 and is held against the post 292. A spring 294 is in a compressed state at normal air pressure.

By increasing the air pressure in the air housing 206, the piston 293 is lifted upwardly. This causes rod 291 to be raised, correspondingly raising the inner tubular shell 262 and thereby raising the ball 278 from its seal on aperture 288.

Referring now to FIG. 10, there is shown a horizontal section showing upper surface 297 of the injector spray head 112. The injector spray head 112 has a substantially octagonal outer peripheral configuration. The heaters 116 are placed in close proximity to alternate sides of the octagonal injector spray head. The heaters 116 extend through the injector spray head 112, from upper surface 297 to a bottom face 298 of the injector spray head 112. The inner tubular shell 262 and the outer tubular shell 260 are substantially coaxial with the central longitudinal axis of the injector spray head 112. A thermistor 300 is secured to the upper surface 297 of the injector spray head 112 by means of mounting lugs 302. The thermistor 300 is capable of sensing the temperature of the injector spray head 112 and, by means of circuitry (not shown), turns the heaters 116 on and off in order to maintain the temperature of the injector spray head 112 at the desired level. The injector spray head 112 should be kept at a temperature which is sufficiently high to allow the sealing material to flow through the apertures in the spray nozzles 114.

Referring now to FIG. 11, there is shown a bottom view of the injector spray head 112. The bottom face 208 of the injector spray head 112 is essentially a right angle truncated octi-pyramidal structure having the four peripheral nozzles 114 distributed alternately on every other face of the injector spray head 112. The heaters 116 are distributed intermediate the nozzles 114. The central nozzle 118 is situated on the right angle truncated portion of the injector spray head. The angle of the faces on which the peripheral nozzles 114 are situated may vary. The faces on the injector spray head 112 are approximately 60° from the normal as represented by the central longitudinal axis of the injector spray gun 110. The peripheral nozzles 114 and the central nozzle 118 can be of different varieties. The peripheral nozzles 114 and the central nozzle 118 have hemispherical heads 304. The planar surface of each of the hemispherical heads 304 flares into a hex-nut 306 to allow the nozzles to be easily secured into the injector spray head 112.

Referring now to FIG. 12, there is shown an enlarged section through the injector spray head 112. The housing 280 is affixed rigidly to the injector spray head 112 by means of threads 308. The ball 278 is seated on the upper edge of the aperture 288, thereby sealing the aperture 288 until the ball 278 is raised from its seat on the aperture 288.

A tunnel network 310 extends radially from the center of the injector spray head 112. The tunnels 310 extend from a spray material distributor 312 which has a series of apertures 313 which connect with tunnel network 310. The tunnel network 310 extends radially to the peripheral nozzles 114.

A number of branches 316 extend downwardly from the radial-tunnel network 310 into the central nozzle 118. Each peripheral nozzle 114 has a head 318, each head 318 having a groove 320 disposed around the periphery of the head 318 in a plane transverse to the central longitudinal axis of each of the peripheral nozzles 114. One tunnel of the tunnel network 310 leads into each groove 320. A number of branches 322 lead from each of the grooves 320 to an exit orifice 323 in each of the peripheral nozzles 114. Each set of branches 322 is substantially perpendicular to the plane of the corresponding groove 320. The injector spray head 112 has a number of cavities on the bottom face 298. Each of these cavities is substantially complementary to the head 318 of each of the peripheral nozzles 114. The injector spray head also has a central cavity which is substantially complementary to the head 318 of the central nozzle 118.

Referring now to FIG. 13, there is shown the branch distribution insert for each of the peripheral nozzles 114. The branches 322 are disposed in a substantially circular pattern having as its center the central longitudinal axis of the peripheral nozzle 114. The branches 322 communicate with the inner surface of the hemispherical head 304 of the peripheral nozzle 114.

Referring now to FIG. 14 there is shown a branch distribution insert for the central nozzle 118. A number of grooves 324 extend radially from the central longitudinal axis of the central nozzle 118. The width of each of the grooves 324 is substantially equal to the diameter of each of the branches 316. The branches 316 are disposed in a substantially circular pattern having as its center the central longitudinal axis of the central nozzle 118. Each of the grooves 324 substantially brackets one of the branches 316.

Referring now to FIG. 15 there is shown a plan view looking into a carton 26 which has been sprayed by the injector spray gun 110. Each nozzle in the injector spray head 112 ejects a spray pattern which is substantially circular when viewed on a plane transverse to the central longitudinal axis of the nozzle which is emitting the spray. The central nozzle 118 sprays a circle of sealing material "A" having as its center the intersection of "C" of the lines joining the opposite corners of the container. The spray gun 110 is lowered into a container 26 such that the spray from the central nozzle 118 coats a circle having a surface area of approximately one-half the surface area of the bottom surface 28 of the container 26.

The peripheral nozzles 114 also emit a circular spray of sealing material in a plane transverse to the direction of emission of the nozzle. However, the central axis of each of the peripheral nozzles 114 is inclined at an angle from the central longitudinal axis of the spray head 112 so that the central longitudinal axis of each nozzle passes through one of the edges formed by the intersection of two of the vertical surfaces of the container 26. Thus, approximately one quarter of the spray material hits the bottom surface 28 of the container 26. The remaining spray is deposited on both of the intersecting surfaces which form the edge into which the peripheral nozzle 114 is pointed. Each surface is coated with approximately one half of the remaining spray from the peripheral nozzle 114. The portion of the spray from each of the peripheral nozzles 114 which coats the bottom of the container 26 forms a quadrant "B" having as its center the point formed by the intersection of the two intersecting surfaces and the bottom 28. Each of the quadrants "B" has a radius of approximately one quarter the length of a diagonal crease line 350. Therefore each of the quadrants "B" will overlap with the central spray area "A" in the vicinity of one of the crease lines 350.

Referring now to FIG. 16 there is show an oblique sectional view of the sprayed container 26. The bottom 28 of the container 26 has a mating pleat structure comprising a first pleat 352 comprised of three layers formed into a "Z" or reverse "Z" structure according to the edge through which the pleat 352 is viewed. An upper layer 354 of the pleat 352 extends horizontally from one vertical wall and is an extension of the vertical wall of the container 26. The layer 354 extends into approximately the center of the conainer where it reverses direction and forms a second layer 356 which travels back out to the vertical edge of the container where the second layer 356 reverses direction and travels inwardly approximately one-half of the distance to the center of the container. A bottom layer 360 extends from the adjacent vertical wall a sufficient distance to traverse the center of the container and overlay layer 358.

The central spray area "A" forms a continuous overlayer between the first layer 354 and the bottom layer 360. The spray from each of the peripheral nozzles 114 coats both of the vertical surfaces which, along with the bottom 28, form the respective centers of each of the quadrants "B." Areas "D" which are sprayed on either vertical surface are substantially mirror images of one another, each area "D" being substantially parabolic in shape extending from a communal high point "H" outwardly along each vertical face to form an inverted parabolic function having as its apex the point "H" and terminating at the bottom 28 of the container 26.

Referring now to FIG. 17 there is shown a simplified electrical circuit diagram which, in combination with the cam schedule of FIG. 18, causes the machine to operate in a timed sequence. The drawing of the camming sequence in FIG. 18 is situated such that the order of the sequential operation from the start of the cycle to the end of the cycle corresponds with the switching diagram of FIG. 17. For example, reading from top to bottom, a double-pole line switch 390 connects power to the circuit when the double-pole line switch 390 is closed. A pilot light 392, in parallel with the double-pole line switch 390, signals this condition. When the sequence starter switch 60 is activated by the movement of the pusher body 82 against the arm 58, the sequence starter switch 60 activates a timer solenoid 394 which in turn connects power to a timer motor TM through its switch 396.

Timer motor TM operates seven cam actuated switches, each switch being activated by an individual cam. The cam schedule shown in FIG. 18 shows that the various elements of the apparatus are activated in the following order:

1. Cam cycle 401 activates a solenoid 401S to energize the low pressure air jets 70. While the low pressure air jets 70 are still on;
2. Cam cycle 402 activates a solenoid 402S to energize the high pressure air nozzles 102, while both the low pressure air jets 102 and the high pressure air nozzles 102 are on;
3. Cam cycle 403 activates a solenoid 403S to energize the post heater 92 to heat the interior of the container immediately preceding the container which energized the sequence start switch 60. The photosensitive device 148 assures the presence of a container 26 in the heater position;
4. Cam cycle 404 activates a solenoid 404S to energize the carton stop arm 156 so that it is in the "up" position. Cam cycle 404 starts shortly after the low pressure air source has been turned off by the termination of cam cycle 401;
5. Cam cycle 405 activates a solenoid 405S which energizes the injector spray gun mounting assembly 120 to cause the injector spray gun 110 to descend into the container 26. The photo-sensitive device 148 also senses the presence of a container 26 in the spray position;
6. Cam cycle 406 activates a solenoid 406S to energize the injector spray gun 110 to spray sealing material into the bottom 28 of the container 26. However, the spraying does not take place unless the photosensitive device 148 senses the presence of a container in the spray position thereby activating a solenoid 408S to complete the circuit and cause the bottom to be sprayed. Camming cycles 405 and 406 terminate at approximately the same instant and terminate at the same instant that;
7. Camming cycle 407 activates a solenoid 407S to energize the injector spray gun mounting apparatus 120 upwardly.

Lines 410a, 411a, 412a, and 416a show the feedback system for maintaining the injector spray gun 110 at the proper temperature so that the material which is to be sprayed will be kept at a fluid state. As an extension thermistor 416 senses a decrease in the temperature of the injector spray gun 110, it activates the extension temperature controller 410 which, in turn, closes a switch and completes the circuit to an extension heater 412 while simultaneously completing the circuit to a light 411 to indicate that the extension heater 412 is on. A similar apparatus is employed to maintain the temperature of the injector spray head 112 at the desired level. The thermistor 300 senses the temperature of the injector spray head 112. Upon noting a decrease in temperature below the temperature required to maintain the material to be sprayed in a fluid condition, the thermistor 300 activates a manifold temperature controller 418 which in turn supplies power to the heaters 116 while simultaneously supplying power to light 420 to indicate that the heaters 116 are on.

The spraying cycle comprises moving the container from the transfer platform 68 to the injector spray head 110. The container 26 is moved in a substantially circular travel path with the bottom 28 of the container 26 sliding on the lower slide guide members 76, 76A. The bottom 28 of the container 26 is cooled by passing the container over the cooling fountain 34. Because the cooling fountain is disposed intermediate the transfer platform 68 and the injector spray gun 110, the bottom 28 of the container 26 will be cooled prior to having sealing material sprayed into the container. This pre-cooling procedure helps to solidify the molten spray material upon contact with the bottom 28 of the container 26.

In a preferred mode of operation of the injector spray apparatus, the carton 26 is supplied to the loading arm 8 by means of the conveyor 22. The carton 26 is in a horizontal position so that the normally vertical surfaces of the container are horizontal. The container 26 is stopped by an "L" shaped container stop 16 situated at the end 15 of the loading arm 8 opposite the receiving end 12 of the loading arm. The loading arm 8 is pivotally mounted about the end 10 furthest from the receiving end 12 of the loading arm 8 and is pivoted to place the container 26 in an upright position. Arcuate guide members 32 are disposed on either side of the container 26 along the arcuate travel path of the container 26 to prevent the container 26 from falling to one side or the other.

The container 26 is placed in an upright position on the transfer platform 68. The arm 58, having a first and second end with the rubber roller 62 mounted on the first end, is mounted rigidly at its second end to a sequence start switch 60. As the arm 58 is displaced by the pusher body 82 and pusher arms 84, the sequence start switch 60 is tripped by the pivoting action of the arm 58 about the connecting linkage between the sequence starter switch 60 and the arm 58. The sequence starter switch 60 energizes a timer motor TM which starts, the entire cycle.

Specifically, the carton is propelled by a number of low pressure air jets 70 situated so that their air stream 71 are perpendicular to the trailing surface 52 of the container 26 after it has been put into position on the transfer platform 68. The low pressure air jets 70 push the container forward, off of the transfer platform 68 and onto a slide guide 74. The slide guide 74 has a set of lower slide guide members 76, 76A which support the bottom of the container 26 and upper slide guide members 78, 78A which guide the container 26, thereby maintaining the container in a circular path. As the container 26 is blown off of the transfer platform 68 by the low pressure air jets 70, a number of high pressure air jets 102 are activated by the timer motor TM. These high pressure air jets are disposed around the periphery of the apparatus. The air stream emitted from each of the high pressure air jets 102 is substantially tangential to the circular travel path which the container 26 is following. The high pressure air jets 108 propel the container 26 forward and further serve to alter its path to a circular configuration. Each jet 102 initially blows on the outermost surface 56 of the container 26 thereby imparting a force which rotates the container 26 inwardly about its central longitudinal axis. The air from the same air jet 102 then passes from the outer surface 56 to the trailing surface 52 to blow the container 26 forward along its circular travel path as the container is pushed forward by the low pressure air jets 70.

While the container is being blown to the spraying position, a pusher assembly 82 is being rotated on circular disc 83 having a center which is substantially coaxial with the center of the travel path of the container 26. The pusher arm 84 of the pusher assembly 82 extends into the travel path of the container 26. However, the container 26 is pushed ahead of the pusher arm 84 by means of the both sets of air jets 70 and 102 so that the container 26 will arrive at the spraying station and be sprayed prior to being engaged by the pusher arm 84. As the container 26 is pushed forward by the combination of the low pressure air jets 70 and the high pressure air jets 102, it is cooled by passing it over the cooling fountain 34 which is disposed between the lower slide guide members 76, 76A. The cooling fountain 34 is supplied with water which is bubbled through the upper surface 106 of the cooling fountain 34 through apertures 108 and provides a cooling medium to the bottom 28 of the container 26 as the container 26 travels along the slide guide 74. The bottom 28 of the container 26 is thereby pre-cooled prior to being sprayed. The cooling fountain 34 subtends an arc of approximately 80° to 90° and terminates at the injector spray gun 110.

The carton stop arm 156 stops the forward motion of the container 26 by rising into the travel path when the container 26 has reached the spray area. As the container 26 reaches the spray area, a portion of the container 26 comes between the light source 146 and the mirror 86 used to reflect light from the light source 146 to the photosensitive cell 148. This light source 146 and mirror 86, in conjunction with the photo-sensitive cell 148, senses the presence of a container 26 at the spray position. The light from the light source 146 is normally reflected from the mirror 86 into the photosensitive cell 148 of the sensing apparatus, thereby maintaining the associated circuitry in an open position. However, when the beam of light is interrupted, the solenoid switch 148S is activated and the circuit closes. The photoelectric system serves as a safety device to ensure the presence of a container 26 at the spray station, thereby eliminating the possibility of the spraying of hot wax by the injector spray gun 110 when there is no container 26 in position.

With the container in position, the photoelectric solenoid 148S closes the spraying circuit while the timer motor TM activates the cammed solenoid 405S to energize the injector spray gun mounting apparatus 120. The spray gun 110 is mounted on the injector spray gun mounting apparatus 120 by means of the horizontal support rods 132. The injector spray gun mounting apparatus 120 moves up and down on a vertical piston rod 122 according to the pressure differential in the upper and lower halves of the mounting cylinder 168 of the injector spray gun mounting apparatus 120. The injector spray gun mounting apparatus 120 is prevented from rotating about the piston rod 122 by means of the retaining pad 135 and the associated clamp rods 136 which provide an enclosure in which the mounting cylinder 168 can move vertically, but cannot rotate about its axis. The clamp rods 136 are affixed to the mounting plate 137, which in turn is affixed rigidly to the vertical support member 124 on the frame 2 of the apparatus.

As the injector spray gun mounting apparatus 120 descends downwardly in response to the energization of the "cylinder down" solenoid 405S, the spray gun 110 correspondingly moves downwardly in a substantially vertical direction. Prior to the spray gun 110 reaching its most downward point, the timer motor TM activates the injector spray gun 110 to spray molten sealing material onto the bottom 28 and lower portions of the vertical sides 50, 52, 54, and 56 of the container. A substantially continuous flow of molten sealing material is maintained through the spray gun 110. The entire spray gun 110 is kept at a temperature which permits the flow of molten sealing material through the passage 264 formed by the inner tubular shell 262 and the outer tubular shell 260. In the closed position, the ball 278 of the inner tube 262 is seated on the head aperture 288 to prevent the flow of molten material into the injector spray head 112. When the injector spray gun 110 is activated by the increase in air pressure in the air housing 206 at the top of the injector spray gun 110, a downward force is exerted on the center piston 293 of the injector spray gun 110. This trips the switch 292 thereby raising the rod 291 connected to the ball 278, and unseating the ball 278 from its seat on the injector spray head aperture 288.

The molten sealing material, being under pressure, forces its way into the radial channel network 310 in the injector spray head 112 and is distributed from there by means of the groove 320 and the branch network 322 in each of the injector spray nozzles 114, 118 to the central aperture of each of the nozzles 114, 118. The central nozzle 118 applies a coating on a circle having as its center the central longitudinal axis of the container 26. The four peripheral nozzles 114 apply coatings to the four corners of the bottom 28 of the container and the lower portion of the four vertical sides 50, 52, 54 and 56 of the container. The spray from the central nozzle 118 and the spray from the peripheral nozzles 114 overlap each other along the diagonals 350 of the bottom 28 of the container 26.

The timer motor TM simultaneously deenergizes the spray switch 406S, thereby releasing the pressure in the air housing 206 of the injector spray gun 110 and reseating the ball 278, and activates the solenoid 407S which energizes the air source connected to the lower portion of the mounting cylinder 168 in the injector spray gun mounting apparatus 120 to force the mounting cylinder 166 upward along the piston rod 122, thereby withdrawing the injector spray gun 110 from the container 26. At the same time that the injector spray gun 110 is raised, the container stop arm 156 is lowered to a position below the lower surface of the bottom 28 of the container 26 and the pusher body 82, which has been traveling with the circular disc 83, catch up to the trailing surface 52 of the container 26. The arms 84 of the push rod contact the trailing surface 52 of the container 26 and push it along its circular travel path. As the container 26 is pushed around by the pusher rod arms 84, the next container is placed into position and the timer motor TM re-initiates the entire cycle.

Depending on the type of material which is to be sprayed and the duration of the spray, a flame from the heater 92 may be used to fuse the dust, created by overspraying, to the walls 50, 52, 54 and 56 and bottom 28 of the container 26. The material sprayed is a low viscosity blend of petroleum wax and various polymers. For example, the coating material manufactured by Shell under the title XPW-1036 or the hot melt manufactured by Boler under the name L-196-67 can be used. The material is maintained at a temperature of over 200°F., both in the tubes leading to and from the injector spray gun 110 and while it is in the injector spray gun 110 and the injector spray gun head 112. The temperature is, of course, a variable depending on the type of hot melt which is employed. The pressure at which the melt is supplied to the injector spray gun 110 is in the vicinity of 1,600 lbs. per sq. in. although this too is a variable depending on the varity of hot melt employed.

In one gallon containers, the spray time is approximately one tenth of a second. However, overspraying may sometimes occur due to the residue of wax within the spray nozzles 114, 118 after a previous spray cycle has been terminated. When this occurs a gas heater 92 can be supplied downstream of the spraying assembly. The heater 92 shoots a flame downwardly into the carton so as to remelt the surface layer of the material thereby fusing the oversprayed material into the walls of the container 26. The flame can be of a number of varieties. However, a gas flame which has a cross sectional area substantially smaller than the cross sectional area of the container 26 is preferred because the flame sets up a convection current which causes heated air to go downwardly in the vicinity of the center of the container 26 and then upwardly along the sides of the container 26, thereby carrying any unfused dust out of the container itself.

It is to be understood that the terms employed are merely illustrative and in no way are meant to limit the range of equivalents which may be used within the scope and spirit of the invention, and particularly that the embodiments disclosed are in no way exhaustive of the various combinations of structural elements and process steps which utilize the inventive concept.

What is claimed is:

1. Apparatus for injection spraying of a container with a sealing material, said container having a bottom and a plurality of vertical sides as the container travels along a travel path having a beginning and an end comprising means for guiding and supporting said container as said container travels along said travel path, said guiding and supporting means having a plurality of arcuate members disposed in a plane parallel to the travel path of said container, a first one of said plurality of arcuate members having a radius of curvature smaller than the radius of curvature of the travel path of said container and a second one of said plurality of arcuate members having a radius of curvature which is greater than the radius of curvature of said travel path, said guiding and supporting means having a receiving end at the beginning of said travel path and a discharge end at the end of said travel path, means for injection spraying said bottom of said container, a plurality of low-pressure air jets disposed in a plane parallel to the plane of said means for guiding and supporting said container, said air jets being arranged to emit a stream of air having force component parallel to said travel path of said container, an arcuate high-pressure air tube having a radius of curvature greater than the radius of curvature of said second one of said plurality of arcuate members, coaxially oriented with respect to said first plurality of arcuate members, said arcuate high-pressure air tube being disposed on the outer periphery of said travel path, said arcuate high-pressure air tube having a beginning at the beginning of said travel path and an end in the vicinity of said means for injection spraying, a plurality of nozzles having central longitudinal apertures arranged for communicating with said arcuate high-pressure air tube, said nozzles being capable of emitting a stream of air having a force component parallel to said travel path, said nozzles facing inwardly and being disposed in a plane parallel to said plane of said means for guiding and supporting said container, an arcuate cooling fountain having a beginning and an end, said beginning of said arcuate cooling fountain being disposed in the vicinity of said receiving end of said means for guiding said container and said end of said cooling fountain being disposed 80° to 90° downstream of the beginning of said arcuate cooling fountain, said means for injection spraying being situated in the vicinity of the end of said arcuate cooling fountain, said means for injection spraying being capable of vertical motion with respect to said bottom of said container to descend toward and withdraw from said bottom of said container, an annular member having a vertical central axis, said annular member being coaxial with the centers of said plurality of arcuate members, said annular member being capable of rotation about its center, a plurality of pusher bodies disposed intermediate the inner radius of curvature of said annular member and the outer radius of curvature of said annular member and being affixed to said annular member disposed approximately 120° from one another, and means for heating said bottom of said container as said container travels along said travel path comprising a gas jet assembly including a pilot light assembly and a full flow gas assembly, said pilot light assembly being capable of maintaining a sufficient flow of gas through said gas jet assembly to maintain a pilot flame and said full flow assembly being capable of supplying gas to said heater in sufficient quantity to remelt the sealing material deposited on said bottom of said container as said container travels along said travel path.

2. Apparatus according to claim 1 in which said means for heating said bottom of said container furter comprises a solenoid switch for opening and closing said full flow gas assembly of said heating assembly in response to a signal.

3. An apparatus for injection spraying of a container with a sealing material, said container having a bottom and a plurality of vertical sides as said container travels along a travel path having a beginning and an end comprising a slide guide for guiding and supporting said container as said container travels along said travel path, said slide guide having a plurality of upper arcuate slide guide members, and a plurality of lower arcuate slide guide members, said upper and lower slide guide members having coterminous receiving ends at the beginning of said travel path and coterminous discharge ends at the end of said travel path, an air jet assembly for propelling said container from said receiving end along said travel path by imparting a force to said container, said force having a component which is parallel to said travel path of said container, a cooling fountain disposed intermediate said plurality of lower arcuate slide guide members for cooling said bottom of said container as said container is propelled along said travel path, an injection spray gun vertically situated with respect to said travel path of said container, said injection spray gun having an upper end and lower end, an injection spray head fixed to said lower end of said injection spray gun, said injection spray head having an upper face and a right angle truncated octipyramidal lower face, and a plurality of nozzles disposed on alternate faces of said right angle truncated octipyramidal lower face of said injection spray head, each nozzle being capable of emitting a spray of sealing material and each comprising a cylindrical receiving end having a central longitudinal axis and a bulbous emitting end, said bulbous emitting end having a central aperture therein, said aperture in said bulbous emitting end being substantially coaxial with said central longitudinal axis of said cylindrical receiving end, a peripheral groove disposed around the periphery of said receiving end in a plane transverse to said central longitudinal axis of said cylindrical receiving end, and a duct communicating between said groove in said cylindrical receiving end and said aperture in said bulbous emitting end.

4. Apparatus for injection spraying according to claim 3 further comprising a central nozzle having a cylindrical receiving end having a central longitudinal axis, a bulbous emitting end having an aperture, said aperture being substantially coaxial with said central longitudinal axis of said cylindrical receiving end a duct communicating between said aperture in said injection spray head and said aperture in said bulbous emitting end of said central nozzle.

5. An apparatus for injection spraying of a container with a sealing material, said container having a bottom and a plurality of vertical sides as said container travels along a travel path having a beginning and an end comprising a slide guide for guiding and supporting said container as said container travels along said travel path, said slide guide having a plurality of upper arcuate slide guide members, and a plurality of lower arcuate slide guide members, said upper and lower slide guide members having coterminous receiving ends at the beginning of said travel path and coterminous discharge ends at the end of said travel path, an air jet assembly for propelling said container from said receiving end along said travel path by imparting a force to said container, said force having a component which is parallel to said travel path of said container, a cooling fountain disposed intermediate said plurality of lower arcuate slide guide members for cooling said bottom of said container is propelled along said travel path, an injection spray gun vertically situated with respect to said travel path of said container, said injection spray gun having an upper end and lower end, an injection spray head fixed to said lower end of said injection spray gun, said injection spray head having an upper face and a right angle truncated octipyramidal lower face, and a plurality of nozzles disposed on alternate faces of said right angle truncated octipryramidal lower face of said injection spray head, each nozzle being capable of emitting a spray of sealing material, said injection spray gun being comprised of a first hollow tubular member having an upper end and a lower end, a second hollow tubular member having a diameter greater than the diameter of said first hollow tubular member and having an upper end and a lower end, said first hollow tubular member being coaxial with and disposed within said second hollow tubular member, a sealing material housing having a plurality of apertures therein, a first one of said apertures of said sealing material housing communicating with a cavity formed by the outer surface of said first hollow tubular member and the inner surface of said second hollow tubular member, a second one of said apertures in said sealing material housing communicating with the interior of said first hollow tubular member, a means for biasing said lower end of said inner hollow tubular member into contact with said upper surface of said injection spray head, an aperture extending from said upper face of said injection spray head to said lower face of said injection spray head, said aperture being substantially coaxial with said first hollow tubular member and said second hollow tubular member, means for sealing said aperture in said injection spray head, said means being affixed to said lower end of said inner hollow tubular member and being seated on such aperture, and means overcoming said biasing means to raise the lower said inner hollow tubular member to unseal and seal said aperture in said injection spray head.

6. An apparatus for injection spraying of a container with a sealing material, said container having a bottom and a plurality of vertical sides as said container travels along a travel path having a beginning and an end comprising a slide guide for guiding and supporting said container as said container travels along said travel path, said slide guide having a plurality of upper arcuate slide guide members, and a plurality of lower arcuate slide guide members, said upper and lower slide guide members having coterminous receiving ends at the beginning of said travel path and coterminous discharge ends at the end of said travel path, an air jet assembly for propelling said container from said receiving end along said travel path by imparting a force to said container, said force having a component which is parallel to said travel path of said container, a cooling fountain disposed intermediate said plurality of lower arcuate slide guide members for cooling said bottom of said container as said container is propelled along said travel path, an injection spray gun vertically situated with respect to said travel path of said container, said injection spray gun having an upper end and lower end, an injection spray head fixed to said lower end of said injection spray gun, said injection spray head having an upper face and a right angle truncated octipyramidal lower face, a plurality of nozzles disposed on alternate faces of said right angle truncated octipyramidal lower face of said injection spray head, each nozzle being capable of emitting a spray of sealing material and an injection spray gun mounting assembly comprising a hollow cylinder having a pair of opposed parallel faces, disposed one at either end of said hollow cylinder, a plate disposed within said cylinder in a plane substantially transverse to the central longitudinal axis of said hollow cylinder and being capable of motion therein, said plate having an outer peripheral contour substantially similar to the inner periphery of said hollow cylinder, a rod coaxial with the central longitudinal axis of said cylinder and extending through said cylinder and said plate, said rod being affixed rigidly to said plate and affixed slidably to said cylinder at each of said pair of parallel faces, means for introducing air under pressure into the cavity formed by said hollow cylinder, said plate and one face of said cylinder, means for introducing air under pressure into the cavity formed by said hollow cylinder, said plate and said other face of said hollow cylinder, and means for affixing said injector spray gun mounting apparatus to said injector spray gun.

* * * * *